Nov. 5, 1935.  L. V. BLACK  2,019,595
APPARATUS FOR MAKING CASE HARDENED GLASS
Filed Jan. 10, 1935
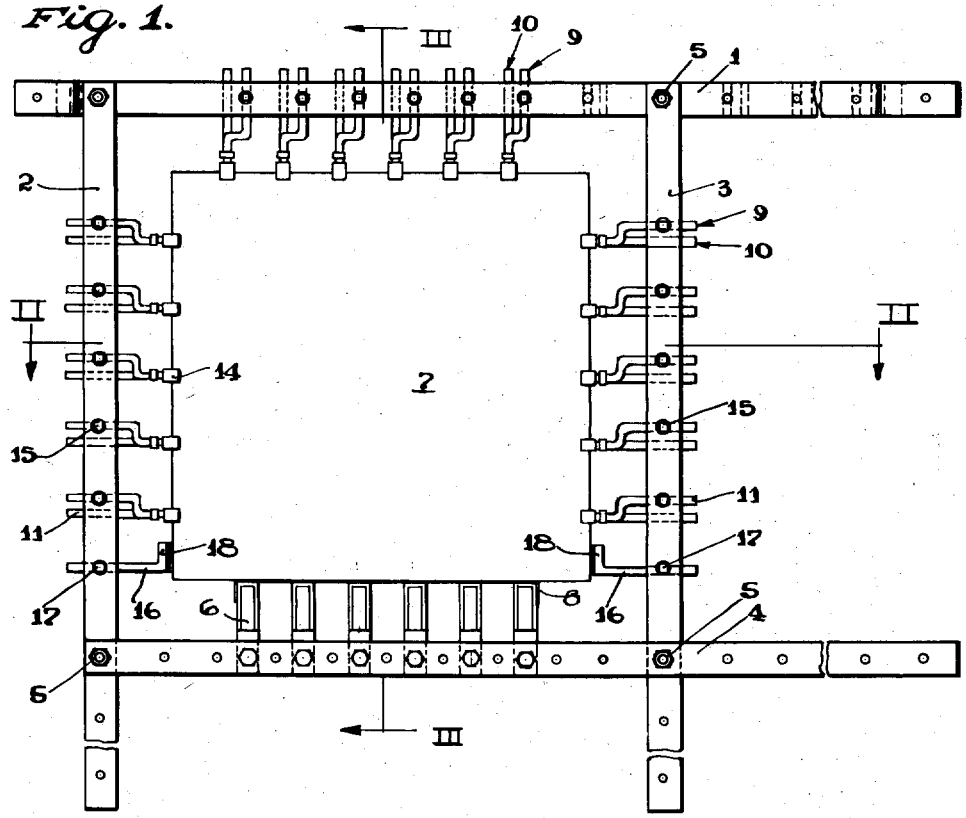
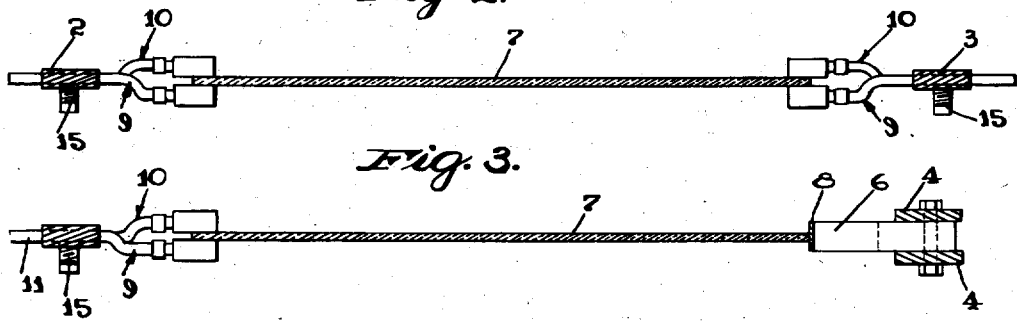
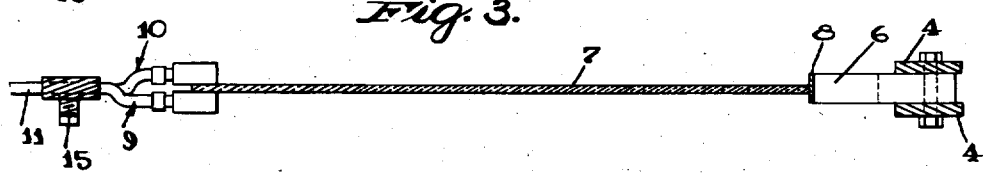
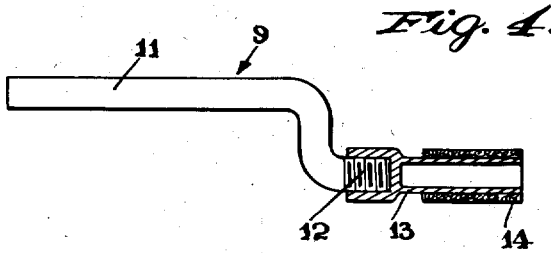
INVENTOR.
LLOYD V. BLACK
BY Bradley & Bee
ATTORNEYS.

Patented Nov. 5, 1935

2,019,595

UNITED STATES PATENT OFFICE 2,019,595

APPARATUS FOR MAKING CASE HARDENED GLASS

Lloyd V. Black, Tarentum, Pa., assignor to Pittsburgh Plate Glass Company, a corporation of Pennsylvania Application January 10, 1935, Serial No. 1,178

4 Claims. (Cl. 49—45)

The invention relates to apparatus for use in the manufacture of case hardened glass, and particularly to the means for supporting the glass in a vertical position during the heating and chilling operations. The device is particularly designed for use in connection with thick plates of glass, but may be used with sheets of any thickness. The invention has for its principal objects the provision of improved apparatus (1) which will support the glass sheets without marring them; (2) which is readily adjustable to glass of any thickness; and (3) which permits of the ready placement of the glass in its support or holder and its removal therefrom. One embodiment of the invention is illustrated in the accompanying drawing, wherein:

Figure 1 is a front elevation of the apparatus.
Fig. 2 is a section on the line II—II of Fig. 1.
Fig. 3 is a section on the line III—III of Fig. 1.
And Fig. 4 is a detail view on an enlarged scale of one of the holding fingers employed in the construction.

The frame of the apparatus consists of four side members 1, 2, 3, and 4 secured together by means of the corner bolts 5. The side members are extended past the points at which they are bolted, as indicated in the drawing, in order to permit the frame to be expanded to handle sheets of glass of larger size. The lower member 4 consists of two bars, as indicated in Fig. 3, which are spaced apart and carry the arms 6. These are in the form of nichrome ribbons bent to U-shape and clamped between the bars which make up the lower side member 4. In order to insulate the upper ends of these members from the glass plate 7, a ribbon or tape 8 of asbestos is stretched across the tops of the series of arms and secured at its ends to the sides of the end members of the series. The arms 6 are thus made relatively light, and since the nichrome metal has low conductivity, the danger of breaking the glass when it is chilled due to too rapid conduction away of the heat is reduced to a minimum.

The side and top edges of the glass sheet are held against lateral movement by two series of fingers preferably arranged in pairs as shown with the ends of one series lying on one side of the plate and the ends of the other series lying upon the other side. The fingers lying on the front side of the plate are designated by the numerals 9, while those lying on the rear sides are designated by the numerals 10. All of these fingers are of the same construction as shown in Fig. 4 and consist of a body or shank 11 and an offset end 12 which is threaded and carries a sleeve 13. This sleeve is provided with an asbestos sleeve 14 to insulate the metal from the glass and to prevent too rapid a conduction of heat from the glass during the chilling operation.

The bars 1, 2, and 3 are provided with perforations in which the shanks or bodies 11 of the fingers fit. The fingers 10 are free to slide through their openings in the frame bars so that in positioning or removing a glass sheet, the sleeved ends of these fingers may be gotten outside the edges of the glass sheet by moving them endwise in an outward direction. The shanks of the fingers 9 are clamped in position by means of the set screws 15 so that they are held against endwise movement and also against rotary movement. This detail of construction permits of an adjustment of the fingers around the axes of the shanks to adapt the device to different thicknesses of glass. After these fingers have been adjusted for a given thickness of glass, they remain in this position of adjustment until a new setting is required due to the requirement for case hardening sheets of greater or less thickness.

In operation, the fingers 10 always occupy the same position as far as rotary adjustment is concerned and the fingers 9 are adjusted around their axes so that the glass sheet is engaged firmly on its opposite sides by the asbestos sleeves 14, the set screws 15 being screwed into clamping position when this adjustment is reached. The apparatus is thus capable of holding glass of any thickness and without danger of marring or breaking it since the glass plate is free to expand in all directions. After the case hardening operation is completed, the glass plate is released by merely moving the fingers 10 outward through the side members until their outer ends clear the edges of the glass sheet. The shanks 11 of these fingers fit their sockets in the side frame members with sufficient snugness so that they will remain in the position to which they are adjusted and at the same time may be moved endwise without difficulty. The arms 6 which support the lower edge of the glass plate are substantially wider than the thickness of the glass so that they will always properly support the glass regardless of its thickness or of the adjustment of the holding fingers.

In order to prevent the glass from moving in a horizontal direction along the arms 6, a pair of additional fingers 16, 16 may be employed, such fingers being held by the set screws 17 and having their ends turned upward, as indicated at 18. The upturned ends are preferably spaced a slight distance away from the edges of the glass plate so as not to interfere with its movement due to expansion. These arms are preferably of light metal of low conductivity provided on their ends next to the glass with thin pads of non-conducting material, such as asbestos.

What I claim is:

1. Apparatus for supporting glass plates for case hardening comprising an open frame, a support therein for the lower edge of a plate, and means for engaging the other edges of the plate comprising two sets of fingers, the members of one set having their inner ends on one side of the plane of the plate and being mounted for movement through the frame in the direction of their length, and the members of the other set having body portions mounted for rotary adjustment in the frame and having their inner ends on the other side of the plane of the plate offset from the body portions, and means for clamping the body portions in their positions of rotary adjustment in the frame.

2. Apparatus for supporting glass plates for case hardening, comprising an open frame, a support therein for the lower edge of a plate, and means for engaging the other edges of the plate comprising two sets of fingers, the members of one set having their inner ends on one side of the plane of the plate and being mounted for movement through the frame in the direction of their length, and the members of the other set having body portions mounted for rotary adjustment in the frame and having their inner ends on the other side of the plane of the plate offset from the body portions, and means for clamping the body portions in their positions of rotary adjustment in the frame, said fingers having their inner ends provided with sleeves of refractory non-conducting material.

3. Apparatus for supporting glass plates for case hardening, comprising an open frame, a support therein for the lower edge of the plate, and means for engaging the other edges of the plate comprising two sets of fingers, the members of one set having their inner ends on one side of the plane of the plate and being mounted for movement through the frame in the direction of their length, and the members of the other set having body portions mounted for rotary adjustment in the frame and having their inner ends on the other side of the plane of the plate offset from the body portions and means for clamping the body portions in their positions of rotary adjustment in the frame, said fingers being arranged so that the inner ends of one set of fingers are in opposition to the inner ends of the other set of fingers.

4. Apparatus for supporting glass plates for case hardening, comprising an open frame, means carried by the frame for supporting the side and upper edges of the plate against lateral movement, and a support for the bottom edge of the plate comprising a series of vertical spaced arms of thin refractory metal carried by the frame and a ribbon of refractory non-conducting material extending across the tops of said arms.

LLOYD V. BLACK.